United States Patent
Smith

(10) Patent No.: US 8,308,449 B2
(45) Date of Patent: Nov. 13, 2012

(54) WAVE ENERGY CONVERTER

(75) Inventor: Alvin Smith, Dartmouth (GB)

(73) Assignee: Dartmouth Wave Energy Limited, Dartmouth, Devon (GB)

(*) Notice: Subject to any disclaimer, the term of this patent is extended or adjusted under 35 U.S.C. 154(b) by 423 days.

(21) Appl. No.: 12/524,441

(22) PCT Filed: Nov. 13, 2007

(86) PCT No.: PCT/GB2007/004366
§ 371 (c)(1),
(2), (4) Date: Jul. 24, 2009

(87) PCT Pub. No.: WO2008/090302
PCT Pub. Date: Jul. 31, 2008

(65) Prior Publication Data
US 2010/0034670 A1 Feb. 11, 2010

(30) Foreign Application Priority Data
Jan. 25, 2007 (GB) .................................. 0701384.0

(51) Int. Cl.
*F04B 35/02* (2006.01)
*F16K 31/36* (2006.01)

(52) U.S. Cl. .......................... 417/331; 417/337; 137/243

(58) Field of Classification Search .......... 417/330–332, 417/337; 137/242, 243, 533.11
See application file for complete search history.

(56) References Cited

U.S. PATENT DOCUMENTS

| | | | |
|---|---|---|---|
| 616,468 A * | 12/1898 | Jones ............................ | 417/330 |
| 644,093 A | 2/1900 | Place | |
| 922,205 A * | 5/1909 | Still ................................ | 417/61 |
| 961,401 A * | 6/1910 | Bonney .......................... | 417/331 |
| 1,665,140 A * | 4/1928 | Master .......................... | 417/331 |
| 1,902,577 A * | 3/1933 | Oakley .......................... | 137/243 |
| 2,537,143 A * | 1/1951 | Levin ............................. | 417/392 |
| 3,255,773 A * | 6/1966 | McQueen ...................... | 137/414 |
| 3,487,228 A | 12/1969 | Kriegel | |
| 3,515,889 A | 6/1970 | Kammerer | |
| 3,988,592 A * | 10/1976 | Porter ............................. | 290/53 |
| 4,076,463 A * | 2/1978 | Welczer ......................... | 417/331 |
| 4,208,878 A * | 6/1980 | Rainey ............................ | 60/496 |
| 4,277,690 A * | 7/1981 | Noren ............................. | 290/53 |
| 4,326,840 A | 4/1982 | Hicks et al. | |

(Continued)

FOREIGN PATENT DOCUMENTS

GB 2 428 747 A2 2/2007

(Continued)

*Primary Examiner* — Charles Freay
(74) *Attorney, Agent, or Firm* — Dinsmore & Shohl LLP

(57) ABSTRACT

A Self Priming Gravity Wave Water Pump, Double Acting, vertically Self Adjusting incorporating a Submerged Column Platform as shown in FIG. 4A, the submerged column platform (22) can be tethered (28) or secured by a pivot to a weight (29) or fixed into the water bed (31). The column (22) can be incorporated into an additional submerged water filled column chamber (23), to operate as a hydraulic tidal adjustable column platform. The Gravity Wave Pump (9) is a wave energy converter using wave energy in the form of wave motion to displace a float (2), to lift the pumps reciprocating piston (12) and uses gravity, causing a weight (3) to push a piston down as the wave passes. The pump could pressurize piped water to a head of up to 100 meters or more and could pump pressures in excess of 150 pounds per square inch when adjusted accordingly.

12 Claims, 7 Drawing Sheets

U.S. PATENT DOCUMENTS

| | | |
|---|---|---|
| 4,408,454 A | 10/1983 | Hagen et al. |
| 4,480,966 A | 11/1984 | Smith |
| 4,754,157 A | 6/1988 | Windle |
| 5,179,837 A * | 1/1993 | Sieber .............................. 60/500 |
| 5,701,740 A * | 12/1997 | Tveter ............................. 60/505 |
| 5,975,865 A * | 11/1999 | Manabe ........................ 417/331 |
| 6,443,653 B1 | 9/2002 | Zingale |

FOREIGN PATENT DOCUMENTS

| | | |
|---|---|---|
| WO | 99/13238 A1 | 3/1999 |
| WO | 01/20163 A1 | 3/2001 |
| WO | 2006/053843 A1 | 5/2006 |

* cited by examiner

WAVE ENERGY CONVERTER

SUMMARY OF THE INVENTION

The invention relates to a Self Priming Gravity Wave water Pump incorporating a Submerged Column Platform, the pump is powered by Wave Energy, the column can be tethered or located by a pivot or fixed in the water bed. The submerged column platform can be incorporated into an additional submerged column chamber to operate as a Hydraulically Controlled Tidal and Storm Adjustable Column platform incorporating the Self Priming Self Adjusting Reciprocating Double Acting Gravity Wave Pump. The Gravity Wave Pump is a wave energy converter using wave energy in the form of wave movement to displace a float to lift the pumps piston, and uses gravity causing a weight to push the piston down. The pump could pump water to a Head of up to 100 meters or more and could pump pressures in excess of 150 pounds per square inch when adjusted accordingly.

The pump is almost fully submerged, it is designed to pump water at pressure using buoyancy displacement to lift the pumps piston as the wave height increases, and using gravity in the form of a heavy weight to push the pumps piston down as the wave passes. The submerged column forming a submerged platform to support the nearly fully submerged self adjusting pump can be rigidly fixed, mounted on a pivot, or tethered. The water can be pumped to a water tower in the water or on land, or can be pumped to a shore based reservoir in the region of 100 meters above the water source, where it could drive water turbines to produce hydro electricity, or to drive machinery, or a reverse osmosis plant before the water is returned to its original source. Pressures are increased by increasing the buoyancy and the weight attached to the same size of pump to obtain higher heads of water. The number of individual pumps can be increased to increase the volume of water at the water requirement, only the buoyant float and impact protection ring and possibly the weight, are visible above the surface, therefore there is only a very minor aesthetic pollution, all the hydraulic action and lubrication in connection with the pump utilises the water source passing through the pump, no oils are used, therefore it is 100% free of oil pollution.

Advantage

The low profile floats of the pumps are not very conspicuous in the surrounding water.

The task of laying (manufactured onshore) weighted tethered submerged air captive column platforms and pumps on the water bed, is much easier and more economical than building unsightly expensive fixed structures offshore on the water bed.

Water craft would probably gain less damage from inadvertantly colliding with tethered pumps than colliding with rigid structures.

The pumps are lubricated by the water they pump.

The advantage of very simple similar components of identical pumps, mean they be can be mass produced at much lower cost than wind turbines, there are no gearboxes or hydraulic oils involved in the pumps, and the pumps can be lifted, disconnected, replaced, reconditioned, reconnected and resited individually, or in small groups with little or no interruption to the electricity supply, and no spill pollution from the disconnection of the pumps.

The similar specification pumps are used as individual pumping units which makes placing them under water easier, they may or may not be linked or group linked, by rigid or flexible pipes weighted on the water bed, which convey the pumped water at pressure to a water tower, or shore based reservoir of up to 100 meters head or more.

The advantage of pumping water to a head means the stored water becomes an available energy source which has the advantage of being controllable, with an at a glance known stock of potential kilowatt hours available, especially to fulfill an emergency requirement.

The wave energy source is the sun and the wind, this source of energy is also used to power wind turbines, but the head of stored water supplied by the gravity wave pumps can be used as available clean energy to drive water turbines after the wind drops.

Hydro produced electricity is a known and proven art, the advantage of a high head of water means a high speed water turbine, directly driving a generator without a gearbox, at an onshore facility greatly reduces generator maintenance costs and there are fewer moving parts.

Onshore access to build and maintain a generating facility greatly reduces the initial and on going costs.

BRIEF DESCRIPTION OF THE DRAWINGS

Examples of the invention will now be described by referring to the accompanying drawings.

DETAILED DESCRIPTION OF THE PREFERRED EMBODIMENTS

Figure 1A:
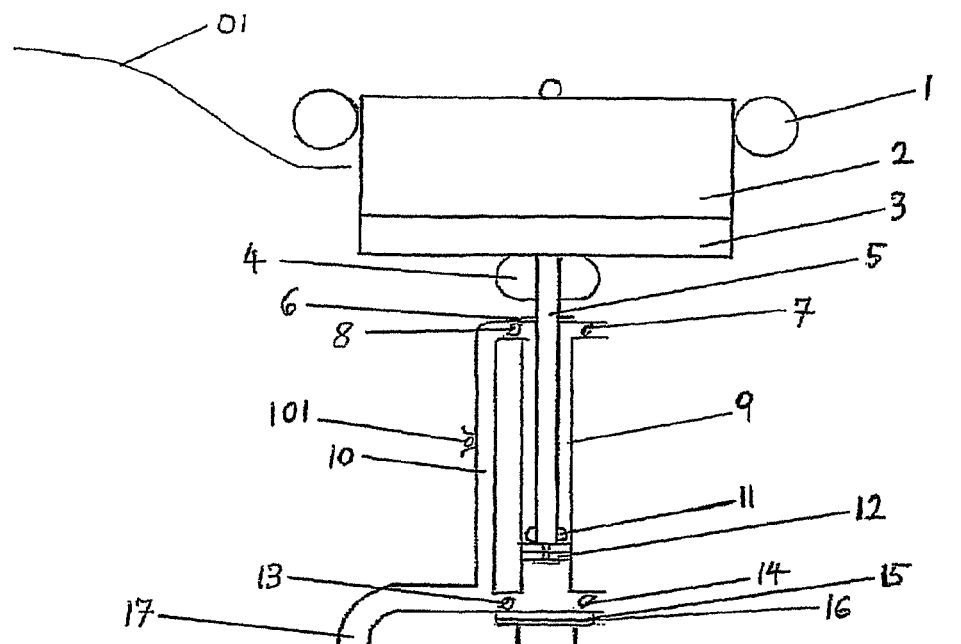
FIG. 1A shows, in cross-section, a rigidly fixed gravity wave pump used in lower wave locations.
Figure 1A:
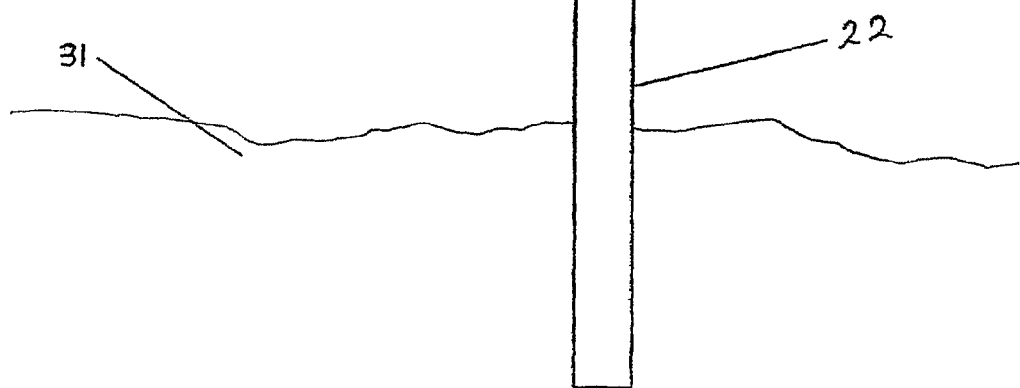

The wave energy converter in its simplest form is shown in FIG. 1A, and includes a platform 22, which supports a assembly comprising a pump 9 and a surface float 2. The platform 22 is a non buoyant non adjustable near vertical column constructed of wood, metal, concrete, or composite materials or other materials. The platform 22 is secured rigidly into or piled into the sea bed, river bed lake bed or reservoir bed 31 at a predetermined fixed height which is below mean height of the available water surface height 01. At the top of this platform 22 is a fixed flange 16, attached to the flange by means of bolts through a matching flange 15, is fixed a submerged, self adjusting to the surrounding water level, gravity wave pump 9.

The pump 9 is a self priming double acting reciprocating pump, and consists of a reciprocating connecting member 5 connected to a double acting piston 12 in a cylinder, with self activating hydraulic inlet valves 7 and 14, as shown in (FIG. 7A) which close on to weed and debris cutting, narrow edged valve seats 07 and 014 and self activating hydraulic outlet valves 8 and 13, which also close on to weed and debris cutting narrow edged valve seats 08 and 013, into a common manifold 10. The pump 9 in FIGS. 1A 2A 3A 4A 5A 6A can be constructed of metal or composite materials. The surface float 2 with impact protection 1 in FIGS. 1A 2A 3A 4A 5A 6A can be constructed of metal or composite materials or concrete or other materials. The surface float 2 can be secured by a pivot or can be rigidly secured to the reciprocating connecting member 5, which is approximately half the diameter of the piston 12. This connecting member 5 passes through a special scraper water seal 6 at the top of the cylinder and is connected to the piston 12, it self adjusts to the surrounding water level by means of the buoyancy displacement of the surface float 2, the travel of its designated self adjustment is decided by the hydrography data of a chosen site combined with design parameters which govern the length of the cylinder, and its corresponding reciprocating connecting member 5, the limit of the piston's travel is protected by impact protection buffers 4 and 11.

A weight 3 in FIGS. 1A 2A 3A 4A 5A 6A is attached to the surface float 2. The weight can be water ballasted, or constructed from concrete or composite materials or metal or other materials, or a container containing a heavy aggregate. The weight 3 can be secured to the reciprocating connecting member 5 by a pivot, or rigidly secured, to the reciprocating connecting member 5. The weight 3 is raised near vertically by the energy of a wave meeting the surface float 2, which lifts the piston 12 which draws water in through inlet valve 14, it forces at pressure water through outlet valve 8. As the wave passes, the weight 3 returns the piston 12 down, drawing water through inlet valve 7, and forces at pressure water through outlet valve 13. This once up stroke and once down stroke of the piston 12 is one complete cycle, and keeps the cylinder charged with water at any time whilst the pump 9 is in its intended submerged state. From outlet valve 8 and outlet valve 13 the water passes at a pre determined maximum pressure through the manifold 10, controlled by a pressure relief valve 101 into outlet pipe 17, where it continues at pressure to the water requirement. A 100 meter head from the pump 9 is possible.

The distance the piston 12 travels up the cylinder is the distance the surface float 2 and weight 3 rise near vertically in a wave, the distance the piston 12 travels down the cylinder is the distance the surface float 2 and weight 3 fall near vertically in the trough after the wave passes. The pump 9 designed length would be matched to the wave height hydrographical records of its intended geographical siting, a pump 9 on a fixed column 22 as shown in FIG. 1A would only be sited in a geographical location of lower wave heights than pumps 9 of FIG. 4A siting. Protection buffer 11 limits upward travel of the piston 12 at which point the surface float 2 and weight 3 lie submerged until an excessive wave passes by, protection buffer 4 limits downward travel upon which the weight 3 and surface float 2 would rest if the trough exceeded in depth beyond the stroke of the piston 12. Immediately after excessive waves or excessive troughs pass, the self priming submerged pump 9 self activates and re-commences pumping water.

Figure 2A:
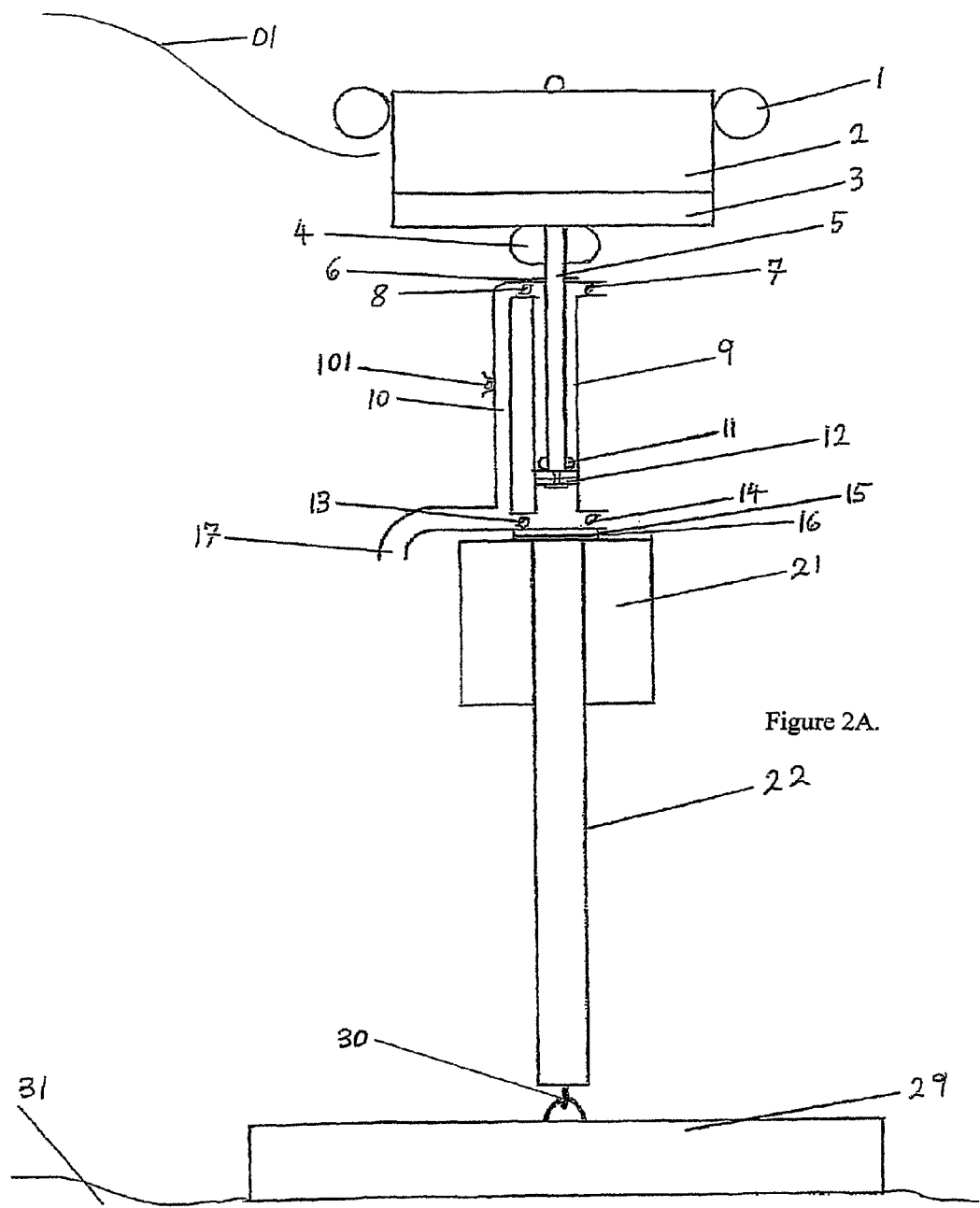
FIG. 2A shows, in cross-section, a pivoting gravity wave pump secured to a weight.

Shown in FIG. 2A at the upper end below the flange 16, the platform 22 is supported nearly vertical in the water by a full submersed float 21 which in this example is in the form of an air captive collar. The fully submersed float 21 is attached equally around the platform 22 and must be of a volume to displace a weight of water greater than the submerged weight, (if any) of the platform 22 plus the combined submerged weight of the pump 9 and its entire components 1 2 3 4 5 6 7 8 9 10 101 11 12 13 14 15 16 17. The platforms 22 in FIGS. 2A 3A 4A 5A 6A are in the form of submerged air captive columns, whilst the platform 22 in FIG. 4A is an adjustable flooded column 23. The platforms 22 can be constructed of metal or composite materials or other materials. The pump 9 in FIG. 2A is attached to the platform 22, and the platform 22 is vertically controlled by a pivot or fulcrum or shackle 30, which is fitted to a weight 29 at the base of the platform 22. The weight 29 must be heavy enough and the pivot or fulcrum or shackle strong enough to restrain the total upward lift of all the buoyant components of the wave energy converter, i.e. the surface float 2 the submerged float 21 and the platform 22, and the pivot or fulcrum or shackle 30 must likewise be strong enough when secured to the sea bed or river bed or lake bed or reservoir bed 31, (as in FIG. 5A).

Figure 3A:
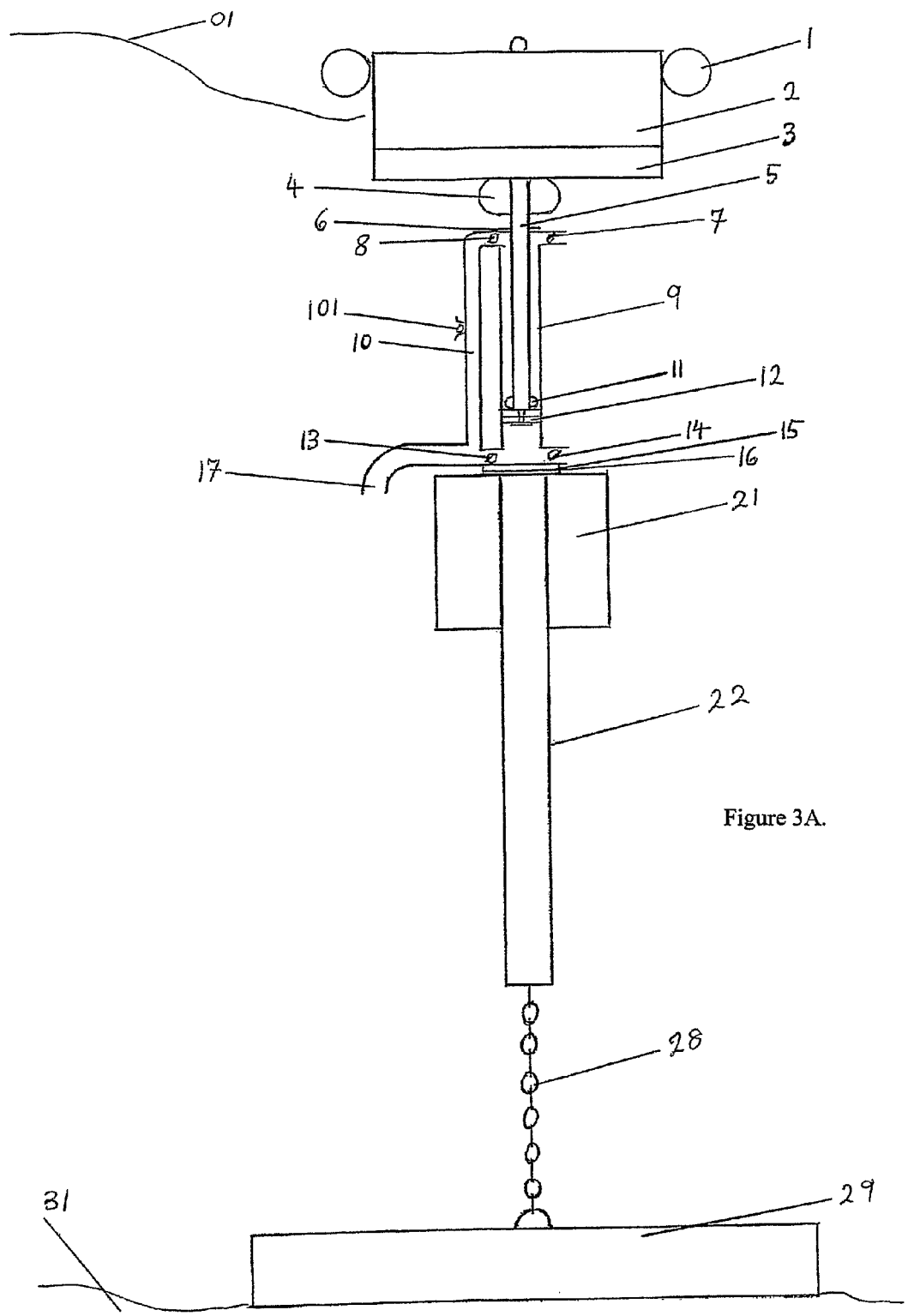
FIG. 3A shows, in cross-section, a tethered gravity wave pump secured to a weight.
Figure 4A:
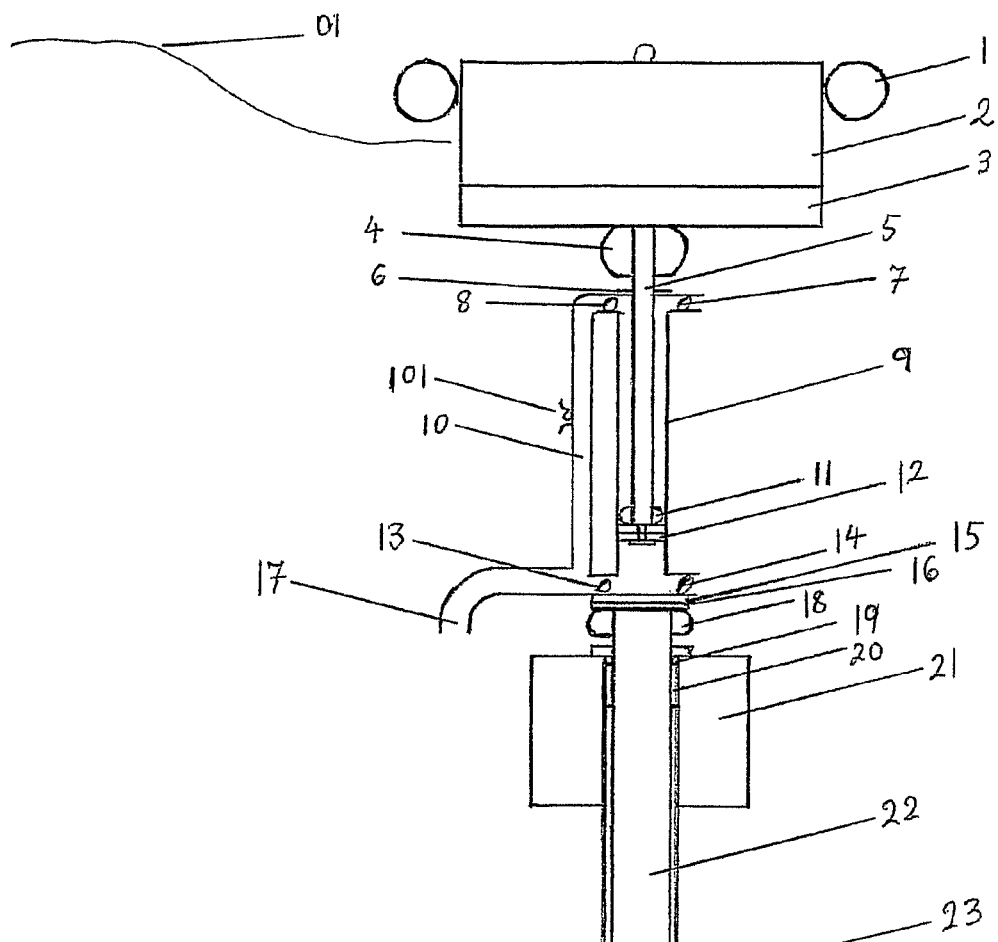
FIG. 4A shows, in cross-section, a tethered adjustable column wave pump.
Figure 4A:
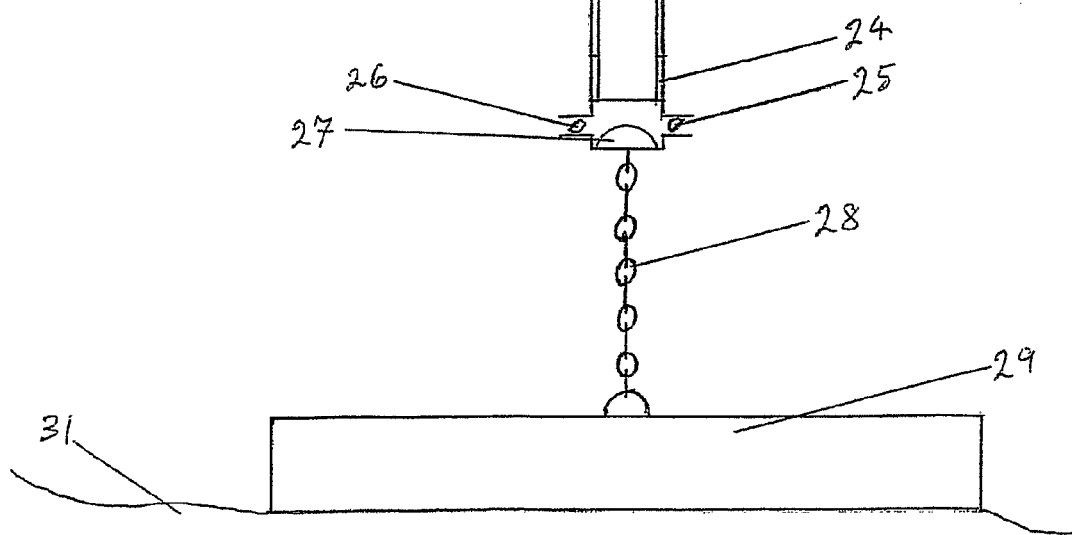
Figure 5A:
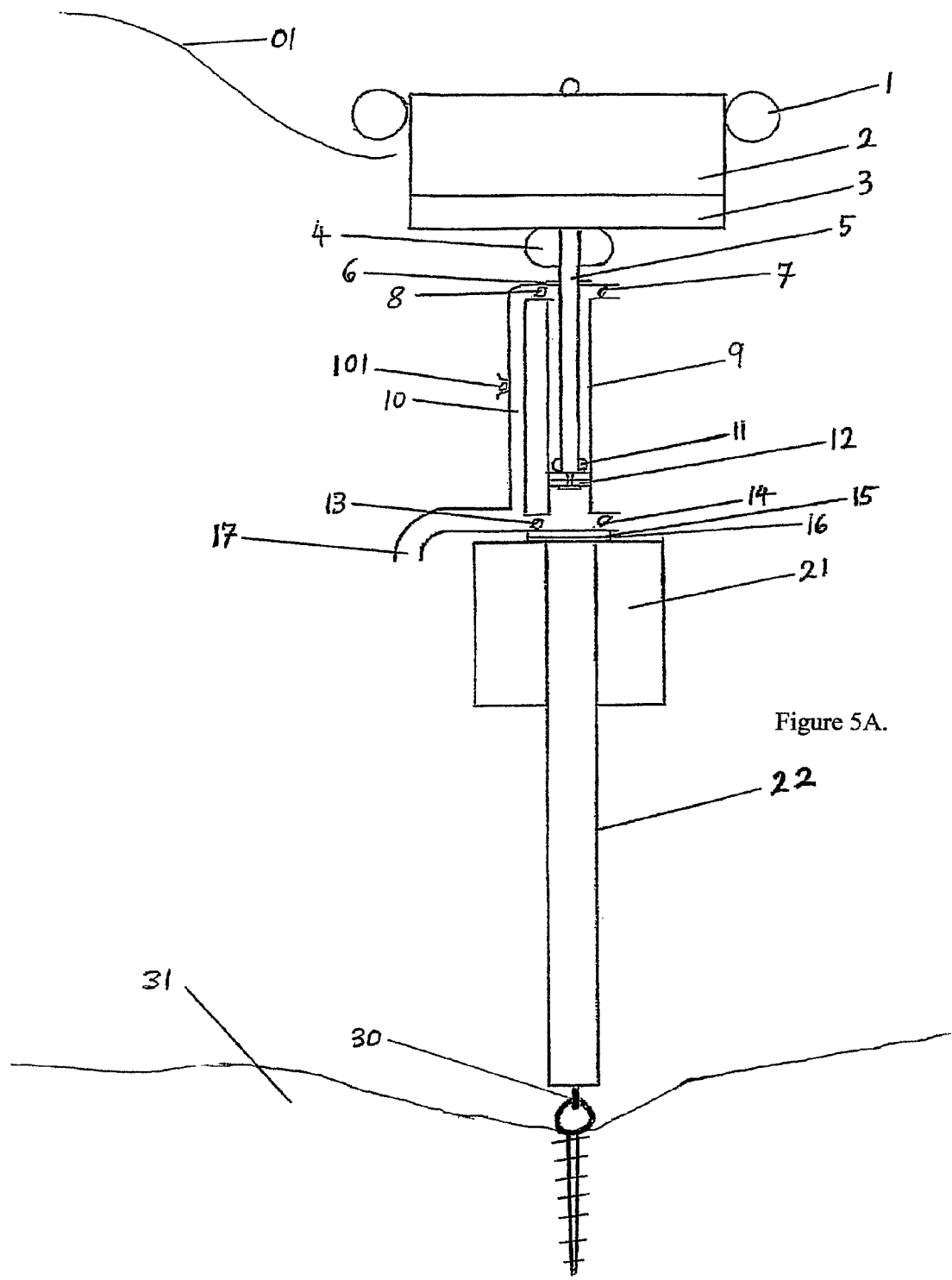
FIG. 5A shows, in cross-section, a pivoted gravity wave pump secured to the water bed.

The pump 9 in FIG. 3A is attached to the platform 22 and the platform 22 is vertically controlled by a tether 28 attached at the upper end to the base of the platform 22 and tether 28 at its lower end secured to a concrete or metal weight 29 resting on the sea bed or river bed or lake bed or reservoir bed 31, or the tether 28 may be secured to the sea bed or river bed or lake bed or reservoir bed 31. The tether can be chain 28, or steel cable or rope or other tether, the chain 28 or steel cable or rope or other tether can be adjusted to suit the geographical siting depth of the mean water level, this means a site of a greater depth can be practical and economical to site the wave energy converter. At its upper end below the flange 16 the platform 22 is supported nearly vertical in the water by a fully submerged float 21, in the form of an air captive collar that is attached equally around the submerged air captive column defining the platform 22. This fully submerged float 21 must be of a sufficient volume to displace a weight of water greater than the submerged weight (if any) of the platform 22, plus the combined submerged weight of the pump 9 and its entire components 1 2 3 4 5 6 7 8 9 10 101 11 12 13 14 15 16 17 28. The tether 28 must be strong enough and weight 29 must be heavy enough to restrain the total upward lift of all of the buoyant components of the wave energy converter, i.e. the surface float 2, the submerged float 21 and the platform 22.

Referring to FIG. 4A, in this embodiment the platform 22 is received in a submerged flooded column 23, which is vertically controlled by a pivot or fulcrum or shackle (as the pivot on column 22 in FIGS. 2A and 5A), or a tether 28 as in FIG. 4A, attached to the base of the column 23, and tether 28 secured to a concrete or metal weight 29, resting on the sea bed or river bed or lake bed or reservoir bed 31, or tether 28 secured to the sea bed or river bed or lake bed or reservoir bed 31. The tether can be chain 28 or steel cable or rope or other tether, the chain 28 or steel cable or rope or other tether can be adjusted to suit the geographical siting depth of the mean water level, this means a site of a greater depth can be practical and economical to site the wave enerqy converter.

FIG. 4A shows at the upper end below flange 16 that the submerged flooded column 23 is supported nearly vertical in the water by a fully submerged float 21 in the form of an air captive collar, which is attached equally around the submerged flooded column 23. The fully submerged float 21 must be of a sufficient volume to displace a weight of water greater than the submerged weight of the submerged flooded column 23, plus the submerged weight (if any) of the platform 22, plus the combined submerged weight of the pump 9 and its entire components, 1 2 3 4 5 6 7 8 9 10 101 11 12 13 14 15 16 17 18 19 20 24 25 26 27 28. The tether 28 must be strong enough and weight 29 must be heavy enough to restrain the total upward lift of all of the buoyant components of the wave energy converter, i.e. the surface float 2, the fully submerged float 21, and the platform 22 in a fully submerged situation.

FIG. 4A shows the platform 22 which can rise up from the secured submerged flooded column 23 as an extending near vertical column platform supporting the gravity wave pump 9. The vertically extending platform 22 allows the pump 9 to continually self position vertically by means of the buoyancy displacement of the surface float 2 positioning its self at the surface level of the surrounding water or height of the tide.

This enables the pump 9 to gain maximum use of the available waves at any height of the tide 01. FIG. 4A shows how the platform 22 can move up or down through guide bearing 20 which is fixed to the upper inner wall of submerged flooded column 23 and scraper water seal 19 which is located at the top of submerged flooded column 23, fixed around and to the base of platform 22 there is a guide bearing 24 which travels up and down the internal walls of the submerged flooded column 23.

FIG. 4A shows how the vertical movement of the platform 22 is governed by a pressure relief outlet valve 26, and a suction relief inlet valve 25, at the base of the submerged flooded column 23. These valves control the resistance of water being drawn in to the submerged flooded column 23 and the pressure of water being expelled from the submerged flooded column 23. This situation creates a hydraulic lock to hold platform 22 in the required position at a load value corresponding to a predetermined setting of the valves which will be greater than the force required by the pump 9 working at its highest pressure but at a setting that allows the surface float 2 or weight 3 to adjust the platform 22 position without the surface float 2 being pulled completely under the water before it sucks inlet valve 25 open allowing water to enter submerged flooded column 23, and at a setting that does not hold the weight 3 airborne above the water 01 before it pressurises outlet valve 26 allowing some water to expel from submerged flooded column 23. The valve governed hydraulic lock holds platform 22 in a position that allows the gravity wave pump 9 to operate within its normal self adjusting stroke, however if the piston in the pump 9 hits buffer 11 due to tidal increase or a higher wave, the extreme lifting force of the greater water displacement imposed on surface float 2 will open inlet valve 25 allowing more water to enter submerged flooded column 23 allowing platform 22 to rise until the valve 25 closes due to less suction because the surface float 2 has reached normal displacement. Similarly, if the weight 3 forces buffer 4 on to the top of pump 9 the additional load will cause pressure relief outlet valve 26 to open allowing water to evacuate submerged flooded column 23 allowing platform 22 to fall vertically until the surface float 2 displacement returns to normal and outlet valve 26 closes, (there is also a protection buffer 27) the pump 9 is then in the correct position to operate normally up to its highest pressure, but can always fine tune its position vertically if a higher wave or a deeper trough passes through.

Figure 6A:
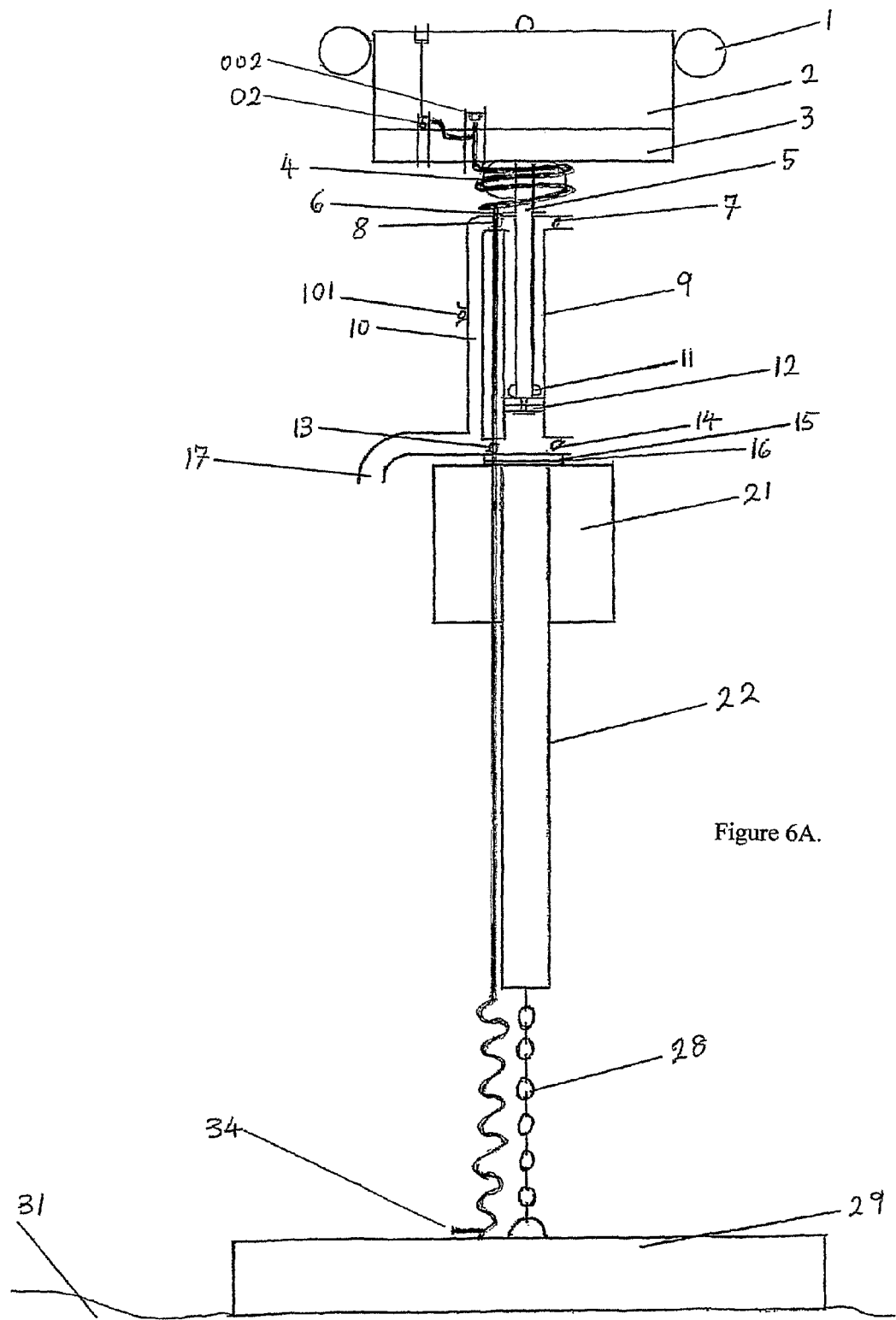
FIG. 6A shows, in cross-section, the air and flood valves in the float.
Figure 7A:
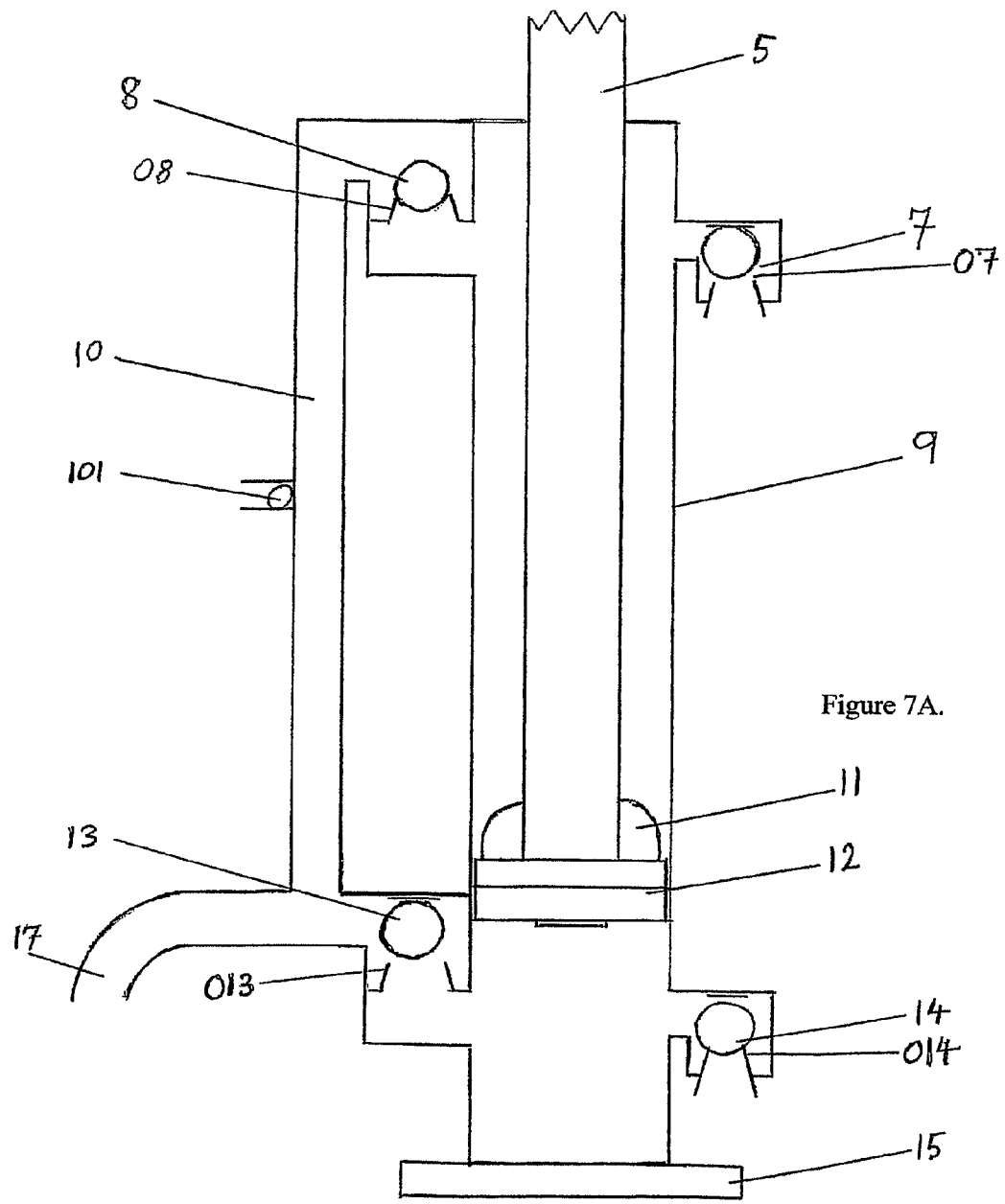
FIG. 7A shows, in cross-section, the spherical valves and valve seats of the pump.

FIG. 4A shows the vertical positioning of platform 22 could also be controlled by connecting a pressure water pipe to inlet valve 25, which could be controlled from a land based control room or floating control room automatically or manually controlled by forcing water, at a controllable pressure in to the submerged flooded column 23 to hydraulically raise platform 22, and by connecting a small bore high pressure pipe carrying a controllable air or water pressure to pneumatically or hydraulically operate valve 26, to release water from submerged flooded column 23 to lower platform 22, or lock platform 22 down on buffer 27 in the event of a storm, assisted by flooding the surface float 2 utilising the valves 02 and 002 and dual air pressure line in FIG. 6A.

In FIG. 4A the surface float 2 must have a displacement capability of lifting the piston 12 at a water pressure necessary to achieve the required head of water, plus lifting the platform 22 hydraulically through the preset inlet limiting valve 25 in submerged flooded column 23, and all the following components 1 3 4 5 6 7 8 9 10 101 11 12 13 14 15 16 17 18 24. The surface float 2 must be of little greater displacement than necessary to achieve the above lifting force, as it is necessary for the surface float 2 in FIG. 4A to submerge by being held under the surface by the fully extended components of the pump 9, and platform 22 in the event of very high waves.

In FIGS. 2A 3A 4A 5A 6A the fully submerged float 21 acts as a lateral shock absorber to the platform 22, absorbing side impacts to the surface float 2 and weight 3 from the waves or water craft, by allowing the platform 22 and submerged flooded column 23 to tilt at various angles, before the fully submerged float 21 self uprights the platform 22 and submerged flooded column 23 again to near vertical. The vertical damping, absorbing vertical shock loadings to the pump 9 and its components, happens naturally in pumping a fluid such as water through the hydraulic valves via a wave-energised float.

The surface float 2 in FIGS. 1A 2A 3A SA 6A must have a displacement capability of lifting the piston 12 at a water pressure necessary to achieve the required head of water plus the following components 1 3 4 5 11 12. The surface float 2 must be of little greater displacement to achieve the above as it is necessary for the surface float 2 in FIGS. 1A 2A 3A 5A 6A to submerge by being held under the surface by the fully extended components of the pump 9 in the event of very high waves.

In certain situations when required, the surface float 2 in FIGS. 1A 2A 3A SA 6A can be flooded with water and submerged to ride out a storm in the closed down position, if fitted with the flood valve 02 drain valve 002 and dual air pressure line 34 as shown in FIG. 6A, which could be controlled manually or automatically from a control room on shore in the event of a storm.

The invention claimed is:

1. A wave energy converter comprising: a buoyant structure configured such that upon placement on a surface of a body of water, said buoyant structure moves in response to both wave energy from the body of water and gravity; a double-acting reciprocating pump having a working upstroke and a working downstroke and comprising a housing and a reciprocating piston disposed within said housing and configured such that upon placement thereof within the body of water, said piston and said housing are maintained in a substantially vertical orientation substantially beneath the surface of the body of water, said piston coupled at a substantially upper end thereof to said buoyant structure such that substantially vertical movement in said buoyant structure is imparted to said piston; and a support structure for supporting the pump in the body of water, the support structure being coupled at a lower end to the bed of the body of water or to a submerged weight via a tether, pivot or fulcrum, the support structure comprising: a platform coupled to the pump; a column coupled to the platform; and a fully submerged float; said column and said platform configured such that upon placement within the body of water, said fully submerged float maintains at least one of said platform and said column in a substantially vertical and submerged orientation, wherein the column and the platform are coupled through a moveable relationship such that the platform can move vertically relative to the column to vary the height of the pump in the body of water.

2. The wave energy converter of claim 1, wherein the platform and the column are in telescopic relation.

3. The wave energy converter of claim 1, wherein said platform defines an air captive chamber therein.

4. The wave energy converter of claim 1, wherein the support structure is coupled to the bed of the body of water or to a submerged weight via a tether, and said fully submerged float possesses sufficient displacement to support the combined submerged weight of the pump, the support structure and the tether and to oppose and overcome downward forces imposed by the piston of the pump on a downward pumping stroke of the piston.

5. The wave energy converter of claim 1, further comprising a plurality of valves configured to control a flow of water into and out of a region defined between said platform and said column in order to facilitate said movable relationship therebetween.

6. The wave energy converter of claim 5, wherein said plurality of valves comprise a water inlet pressure relief valve and a water outlet pressure relief valve.

7. The wave energy converter of claim 5, further comprising: at least one scraper water seal situated at a substantial top of said column; and a plurality of guide bearings disposed within said column such that said at least one scraper water seal, said plurality of guide bearings and at least one of said plurality of valves cooperate to control resistance of water being drawn in a flooded chamber portion between said platform and said column.

8. The wave energy converter of claim 1, further comprising a plurality of inlet valves and a plurality of outlet valves cooperative with said housing and said piston such that at least one of said plurality of inlet valves and at least one of said plurality of outlet valves allow pumping of one portion of the body of water during a vertically upward movement of said piston, while another at least one of said plurality of inlet valves and another at least one of said plurality of outlet valves allows pumping of another portion of the body of water with a vertically downward movement of said piston.

9. The wave energy converter of claim 8, further comprising configuring at least one of said plurality of inlet and outlet valves as a spherical valve with a corresponding narrow valve seat such that a closing motion of said spherical valve acts as a debris cutter.

10. The wave energy converter of claim 1, further comprising an oil-free lubrication system.

11. The wave energy converter of claim 10, wherein said oil-free lubrication system utilizes water pumped by said pump as the lubricant.

12. The wave energy converter of claim 1, wherein the fully submerged float is in the form of an air captive support collar coupled to an upper end of the column.

* * * * *

UNITED STATES PATENT AND TRADEMARK OFFICE
CERTIFICATE OF CORRECTION

PATENT NO. : 8,308,449 B2
APPLICATION NO. : 12/524441
DATED : November 13, 2012
INVENTOR(S) : Alvin Smith It is certified that error appears in the above-identified patent and that said Letters Patent is hereby corrected as shown below:

In the Specifications:

Col. 1, Line 57, "mean they be can be" should read --means they can be--

Col. 2, Line 44, "which supports a assembly" should read --which supports a pump assembly--

Col. 4, Line 45, "enerqy converter" should read --energy converter--

Col. 4, Line 66, "its self" should read --itself--

Col. 5, Line 14, "in to" should read --into--

Col. 6, Line 14, "SA" should read --5A--

Col. 6, Line 24, "SA" should read --5A--

Signed and Sealed this
Thirtieth Day of April, 2013

Teresa Stanek Rea
*Acting Director of the United States Patent and Trademark Office*